United States Patent
Davidson et al.

(10) Patent No.: US 9,950,383 B2
(45) Date of Patent: Apr. 24, 2018

(54) WELDING WIRE PREHEATING SYSTEM AND METHOD

(71) Applicant: ILLINOIS TOOL WORKS INC., Glenview, IL (US)

(72) Inventors: Robert R. Davidson, New London, WI (US); Richard J. Schuh, Freedom, WI (US)

(73) Assignee: Illinois Tool Works Inc., Glenview, IL (US)

( * ) Notice: Subject to any disclaimer, the term of this patent is extended or adjusted under 35 U.S.C. 154(b) by 639 days.

(21) Appl. No.: 14/099,513

(22) Filed: Dec. 6, 2013

(65) Prior Publication Data

US 2014/0217077 A1 Aug. 7, 2014

Related U.S. Application Data

(60) Provisional application No. 61/761,007, filed on Feb. 5, 2013.

(51) Int. Cl.
| | |
|---|---|
| *B23K 9/095* | (2006.01) |
| *B23K 9/10* | (2006.01) |
| *B23K 9/173* | (2006.01) |
| *B23K 9/235* | (2006.01) |

(52) U.S. Cl.
CPC .......... *B23K 9/0956* (2013.01); *B23K 9/1043* (2013.01); *B23K 9/1093* (2013.01); *B23K 9/173* (2013.01); *B23K 9/235* (2013.01)

(58) Field of Classification Search
CPC combination set(s) only.
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 3,288,982 | A | 11/1966 | Haruyoshi |
(Continued)

FOREIGN PATENT DOCUMENTS

| | | |
|---|---|---|
| CA | 2072711 | 12/1992 |
| CN | 2181354 | 11/1994 |
(Continued)

OTHER PUBLICATIONS

International Search Report from PCT application No. PCT/US2014/014241 dated May 9, 2014, 8 pgs.
(Continued)

*Primary Examiner* — Anne M Antonucci
*Assistant Examiner* — Renee LaRose
(74) *Attorney, Agent, or Firm* — McAndrews, Held & Malloy, Ltd.

(57) ABSTRACT

In a welding system, a preheating process is carried out prior to initiation of a welding arc, such as upon depression of a trigger or switch on a welding torch. The preheating process involves generation and application of desired currents and voltages to a welding electrode from a power supply. Preheating is continued until the welding electrode reaches a desired temperature or resistance, which may be determined by reference to an increasing voltage, a decreasing current, a peaked and declining voltage, resistance and/or power measurements, and so forth. Following preheating, a desired welding process may begin with initiation of the welding arc.

23 Claims, 3 Drawing Sheets

(56) References Cited

U.S. PATENT DOCUMENTS

| | | | |
|---|---|---|---|
| 3,725,629 A | 4/1973 | Vickers | |
| 3,809,853 A | 5/1974 | Manz | |
| 3,849,871 A | 11/1974 | Kaunitz | |
| 3,946,349 A | 3/1976 | Haldeman | |
| 4,160,967 A | 7/1979 | Beech | |
| 4,188,419 A | 2/1980 | Detert | |
| 4,222,023 A | 9/1980 | Beech | |
| 4,329,561 A * | 5/1982 | Schafer | B23K 11/25 219/108 |
| 4,426,565 A | 1/1984 | Rueter | |
| 4,447,703 A * | 5/1984 | Stol | B23K 9/1093 219/130.01 |
| 4,493,971 A | 1/1985 | Nawa | |
| 4,531,040 A | 7/1985 | Nawa | |
| 4,536,634 A | 8/1985 | Nawa | |
| 4,546,234 A | 10/1985 | Ogasawara | |
| 4,580,026 A | 4/1986 | Stol | |
| 4,628,182 A | 12/1986 | Hori | |
| 4,631,385 A | 12/1986 | Rothermel | |
| 4,667,083 A | 5/1987 | Stol | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A | 11/1990 | Martin | |
| 5,001,326 A | 3/1991 | Stava | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A | 12/1993 | Hamamoto | |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,526,561 A | 6/1996 | McGaffigan | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn | |
| 5,773,799 A | 6/1998 | Maxfield | |
| 5,783,799 A | 7/1998 | Geissler | |
| 5,844,193 A | 12/1998 | Nomura | |
| 5,963,022 A | 10/1999 | Buda | |
| 5,968,587 A | 10/1999 | Frankel | |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,090,067 A | 7/2000 | Carter | |
| 6,107,602 A | 8/2000 | Geissler | |
| 6,115,273 A | 9/2000 | Geissler | |
| 6,169,263 B1 | 1/2001 | Derby | |
| 6,204,476 B1 | 3/2001 | Reynolds | |
| 6,248,976 B1 | 6/2001 | Blankenship | |
| 6,265,688 B1 | 7/2001 | Lyshkow | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear | |
| 6,515,259 B1 | 2/2003 | Hsu | |
| 6,583,386 B1 | 6/2003 | Ivkovich | |
| 6,596,970 B2 | 7/2003 | Blankenship | |
| 6,624,388 B1 | 9/2003 | Blankenship | |
| 6,642,482 B2 | 11/2003 | Rappl | |
| 6,670,579 B2 | 12/2003 | Davidson | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,984,806 B2 | 1/2006 | Huismann | |
| 6,995,338 B2 | 2/2006 | Hutchison | |
| 7,002,103 B2 | 2/2006 | Holverson | |
| 7,129,443 B2 | 10/2006 | Davidson | |
| 7,145,101 B2 | 12/2006 | Tong | |
| 7,244,905 B2 | 7/2007 | Das | |
| 7,265,320 B2 | 9/2007 | Ou | |
| 7,304,269 B2 | 12/2007 | Fulmer | |
| 7,307,240 B2 | 12/2007 | Holverson | |
| 7,351,933 B2 | 4/2008 | Huismann | |
| 7,683,290 B2 | 3/2010 | Daniel | |
| 8,203,100 B2 | 6/2012 | Ueda | |
| 8,288,686 B2 | 10/2012 | Kaufman | |
| 8,487,215 B2 | 7/2013 | Holverson | |
| 9,403,231 B2 | 8/2016 | Hutchison | |
| 9,539,662 B2 | 1/2017 | Hutchison | |
| 2002/0008095 A1 | 1/2002 | Norrish | |
| 2002/0045970 A1 | 4/2002 | Krause | |
| 2002/0107825 A1 | 8/2002 | Manicke | |
| 2002/0117487 A1 | 8/2002 | Corby | |
| 2002/0117488 A1 | 8/2002 | Arndt | |
| 2003/0058149 A1 | 3/2003 | Jayadeva | |
| 2004/0010342 A1 | 1/2004 | Thelen | |
| 2004/0069759 A1 | 4/2004 | Davidson | |
| 2004/0182828 A1 | 9/2004 | Schmidt | |
| 2004/0222204 A1 | 11/2004 | Hutchison | |
| 2004/0238511 A1 | 12/2004 | Matus | |
| 2005/0184039 A1 | 8/2005 | Stava | |
| 2005/0269306 A1 | 12/2005 | Fulmer | |
| 2006/0163229 A1 | 7/2006 | Hutchison | |
| 2007/0051711 A1 | 3/2007 | Kachline | |
| 2007/0084840 A1 | 4/2007 | Davidson | |
| 2007/0102407 A1 | 5/2007 | Uezono | |
| 2007/0170163 A1 | 7/2007 | Narayanan | |
| 2007/0235434 A1 | 10/2007 | Davidson | |
| 2007/0267394 A1 | 11/2007 | Beck | |
| 2008/0264916 A1 | 10/2008 | Nagano | |
| 2008/0264917 A1 | 10/2008 | White | |
| 2008/0264923 A1 | 10/2008 | White | |
| 2009/0026188 A1 | 1/2009 | Schorghuber | |
| 2009/0173726 A1 | 7/2009 | Davidson | |
| 2010/0059493 A1 | 3/2010 | McAninch | |
| 2010/0096373 A1 * | 4/2010 | Hillen | B23K 26/1429 219/130.01 |
| 2010/0133250 A1 | 6/2010 | Sardy | |
| 2010/0176104 A1 | 7/2010 | Peters | |
| 2010/0308026 A1 | 12/2010 | Vogel | |
| 2010/0308027 A1 | 12/2010 | Vogel | |
| 2010/0314371 A1 | 12/2010 | Davidson | |
| 2011/0108527 A1 | 5/2011 | Peters | |
| 2011/0114612 A1 | 5/2011 | Holverson | |
| 2011/0163080 A1 | 7/2011 | Beck | |
| 2011/0204034 A1 | 8/2011 | Schartner | |
| 2011/0297658 A1 | 8/2011 | Peters | |
| 2011/0248007 A1 | 10/2011 | Takeda | |
| 2012/0024828 A1 | 2/2012 | Oowaki | |
| 2012/0061362 A1 | 3/2012 | Davidson | |
| 2012/0074112 A1 | 3/2012 | Kotera | |
| 2012/0097655 A1 | 4/2012 | Daniel | |
| 2012/0248080 A1 | 10/2012 | Hutchison | |
| 2012/0291172 A1 | 11/2012 | Wills | |
| 2012/0298642 A1 | 11/2012 | Lambert | |
| 2013/0112674 A1 | 5/2013 | Mnich | |

(56) References Cited

U.S. PATENT DOCUMENTS

| | | | |
|---|---|---|---|
| 2013/0112676 | A1 | 5/2013 | Hutchison |
| 2013/0264323 | A1 | 10/2013 | Daniel |
| 2013/0270245 | A1 | 10/2013 | Holverson |
| 2014/0021183 | A1 | 1/2014 | Peters |
| 2014/0158669 | A1 | 6/2014 | Davidson |
| 2014/0183176 | A1 | 7/2014 | Hutchison |
| 2014/0217077 | A1 | 8/2014 | Davidson |
| 2014/0251971 | A1 | 9/2014 | Hearn |
| 2014/0263237 | A1 | 9/2014 | Daniel |
| 2014/0263241 | A1 | 9/2014 | Henry |
| 2014/0263243 | A1 | 9/2014 | Marschke |
| 2014/0367370 | A1 | 12/2014 | Hutchison |
| 2015/0001197 | A1 | 1/2015 | Marschke |
| 2015/0083702 | A1 | 3/2015 | Scott |
| 2015/0105898 | A1 | 4/2015 | Adams |
| 2016/0074954 | A1 | 3/2016 | Marschke |
| 2016/0144444 | A1 | 5/2016 | Davidson |
| 2016/0167151 | A1 | 6/2016 | Mehn |
| 2016/0288235 | A1 | 10/2016 | Davidson |
| 2016/0318112 | A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| DE | 2501928 | 7/1976 |
| DE | 19808383 | 9/1999 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

"ALT 304," Miller—The Power of Blue, Jun. 2001.
"Maxstar 200 SD, DX, and LX," Miller Electric Mfg. Co., Oct. 2003.
Bondy et al., "Graph Theory with Appliations," University of Waterloo, 1976, p. 7-8.
International Search Report from PCT application No. PCT/US2014/017864, dated Aug. 22, 2014, 9 pgs.
International Search Report from PCT application No. PCT/US2014/041201, dated Nov. 4, 2014, 11 pg.
International Search Report from PCT application No. PCT/US2014/045872, dated Nov. 4, 2014, 10 pgs.
International Search Report from PCT Application No. PCT/US2014/055529, dated Mar. 6, 2015, 9 pgs.
International Search Report from PCT application No. PCT/US2015/045715, dated Jan. 7, 2016, 12 pgs.
International Search Report from PCT application No. PCT/US2015/055040, dated Feb. 3, 2016, 11 pgs.
International Search Report from PCT application No. PCT/US2015/056121, dated Apr. 4, 2016, 11 pgs.
International Search Report from PCT application No. PCT/US2016/017385, dated Jul. 19, 2016, 13 pgs.
International Search Report from PCT application No. PCT/US2013/073490 dated May 13, 2014, 10 pgs.
International Search Report from PCT application No. PCT/US2013/073863 dated May 2, 2014, 15 pgs.
International Search Report from PCT application No. PCT/US2013/077710 dated May 9, 2014, 12 pgs.
PCT International Search Report & Written Opinion of PCT/US2012/063783 dated Mar. 1, 2013, 12 pages.

\* cited by examiner

WELDING WIRE PREHEATING SYSTEM AND METHOD

CROSS REFERENCE TO RELATED APPLICATIONS

This application is a Non-Provisional Patent Application of U.S. Provisional Patent Application No. 61/761,007, entitled "Welding Wire Preheating System and Method", filed Feb. 5, 2013, which is herein incorporated by reference in its entirety for all purposes.

BACKGROUND

The invention relates generally to welders, and more particularly to a welder configured to perform a preheating operation on welding wire prior to execution of a weld.

A wide range of welding systems and welding control regimes have been implemented for various purposes. In continuous welding operations, metal inert gas (MIG) techniques allow for formation of a continuing weld bead by feeding welding wire shielded by inert gas from a welding torch. Electrical power is applied to the welding wire and a circuit is completed through the workpiece to sustain an arc that melts the wire and the workpiece to form the desired weld.

Advanced forms of MIG welding are based upon generation of pulsed power in the welding power supply. That is, various pulsed regimes may be carried out in which current and/or voltage pulses are commanded by the power supply control circuitry to regulate the formation and deposition of metal droplets from the welding wire, to sustain a desired heating and cooling profile of the weld pool, to control shorting between the wire and the weld pool, and so forth. However other welding regimes exist and are commonly used that provide power that is not pulsed. The various regimes may rely on "electrode positive" or "electrode negative" polarities, and the present disclosure may relate to any and all of these.

While very effective in many applications, MIG welding techniques may experience different initial welding performance based upon whether the weld is started with the electrode "cold" or "hot". In general, a cold electrode start may be considered a start in which the electrode tip and adjacent metals are at or relatively near the ambient temperature. Hot electrode starts, by contrast, are typically those in which the electrode tip and adjacent metals are much more elevated, but below the melting point of the electrode wire. In some applications, it is believed that initiation of arcs and welds is facilitated when the electrode is hot. However, the current state of the art does not provide regimes designed to ensure that the electrode is heated prior to initiate of welds.

There is a need, therefore, for improved welding strategies that allow for welding initiation with a heated electrode so as to improve weld performance.

BRIEF DESCRIPTION

The present disclosure relates to methods and systems designed to respond to such needs. In accordance with certain aspects, a welding method comprises receiving a signal indicative of initiation of welding process, and prior to initiating a welding arc, controlling voltage or current applied to a welding electrode to preheat the electrode. Feedback voltage and current are monitored to determine a termination of preheating, and then preheating is terminated and the welding arc is initiated in accordance with a desired welding protocol.

In accordance with another aspect, a welding method comprises receiving a signal indicative of initiation of welding process, and, prior to initiating a welding arc, automatically controlling voltage or current applied to a welding electrode to preheat the electrode. Preheating is then terminated when the electrode reaches a desired resistance or a desired power level as determined based upon monitored current and voltage applied to the welding electrode, and the welding arc is initiated in accordance with a desired welding protocol.

In accordance with a further aspect, a welding system, comprises a power supply comprising power conversion circuitry and control circuitry configured to cooperate to provide welding current and voltage to a welding electrode, a signal source configured to provide a signal for initiation of a welding process, and current and voltage monitoring sensors. The control circuitry is configured to, prior to initiating a welding arc, control voltage and current applied to a welding electrode to preheat the electrode, to monitor the applied voltage and current to determine a termination of preheating, and to terminate preheating and initiate the welding arc in accordance with a desired welding protocol.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
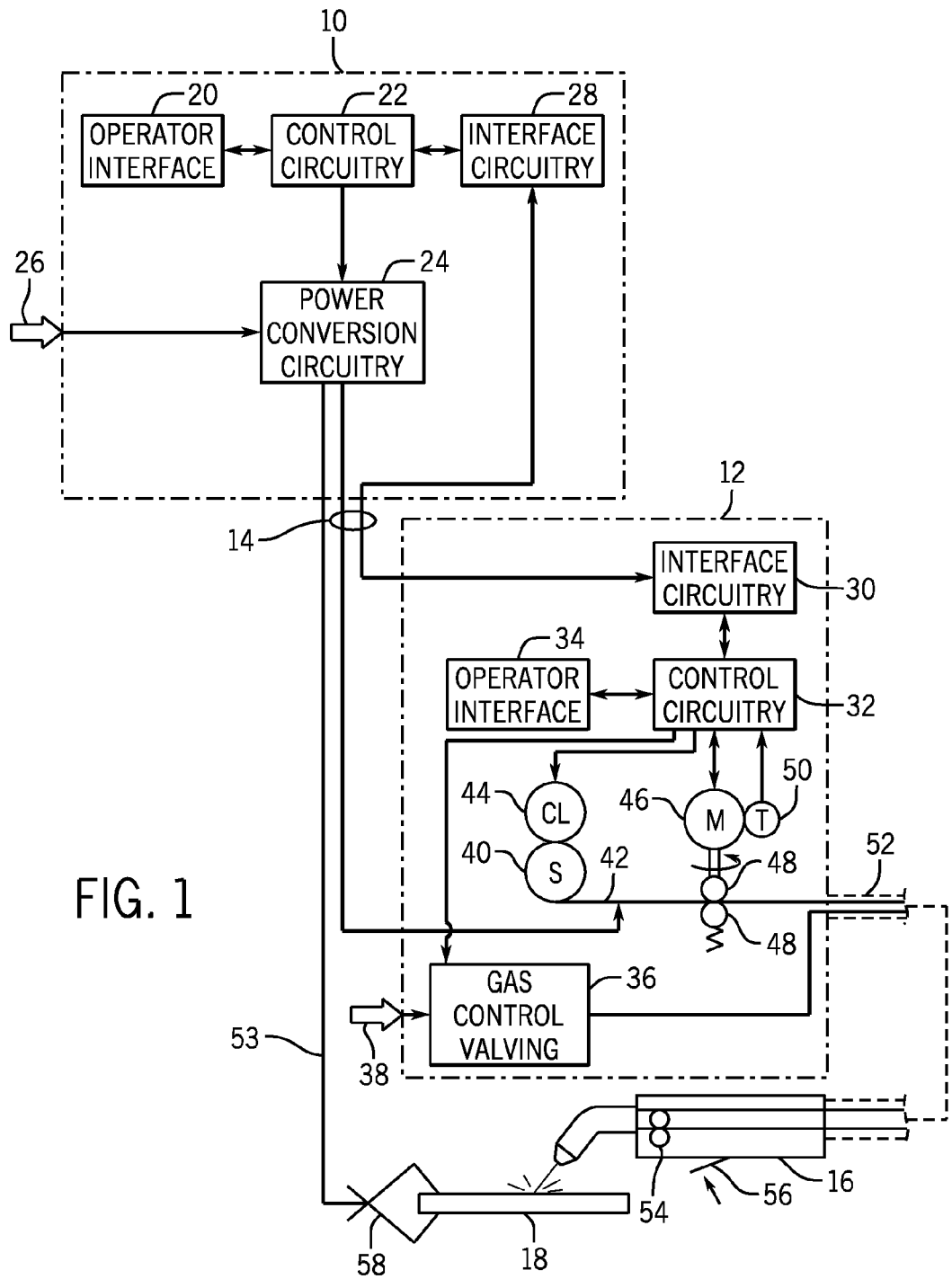
FIG. 1 is a diagrammatical representation of an exemplary MIG welding system illustrating a power supply coupled to a wire feeder for performing welding operations in which an electrode is heated prior to weld initiation.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location, and the conduits 14 are embodied as a welding cable that transmits control signals and power between the power supply 10 and the wire feeder 12. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor is typically run to the welding workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with various steels, aluminums, or other welding wire that is channeled through the torch. These weld settings are communicated to control circuitry 22 within the power supply.

The control circuitry, described in greater detail below, operates to control generation of welding power output that is applied to the welding wire for carrying out the desired welding operation. In certain presently contemplated embodiments, for example, the control circuitry may be adapted to regulate the MIG welding regime, while also providing power for preheating the welding wire electrode prior to initiation of the weld. As described more fully below, such heating may be controlled by altering operating parameters of current and voltage applied to the electrode through the welding cable and torch.

The control circuitry is thus coupled to power conversion circuitry 24. This power conversion circuitry is adapted to create the output power, such as pulsed and non-pulsed waveforms that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shielding gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch and thereby to the welding application, under the control of control circuitry 36. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 36, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply 10 is applied to the wire, typically by means of the welding cable 14 to a torch cable 52 to a work cable 53 in a conventional manner. Similarly, shielding gas is fed through the wire feeder and the torch cable 52. During welding operations, the wire is advanced through the welding cable jacket towards the torch 16. Within the torch 16, an additional pull motor 54 may be provided with an associated drive roller, particularly for aluminum alloy welding wires. The motor 54 is regulated to provide the desired wire feed speed as described more fully below. A trigger switch 56 on the torch provides a signal that is fed back to the wire feeder 12 and therefrom back to the power supply 10 to enable the welding process to be started and stopped by the operator. That is, upon depression of the trigger switch, gas flow is begun, wire is advanced, power is applied to the torch cable 52 and through the torch 16 to the advancing welding wire. These processes are also described in greater detail below. Finally, the work cable 53 and associated clamp 58 allow for closing an electrical circuit from the power supply 10 through the welding torch 16, the electrode (wire), and the workpiece 18 for maintaining the welding arc during operation.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in pulsed welding regimes, the wire feed speed may be altered periodically or cyclically.

Figure 2:
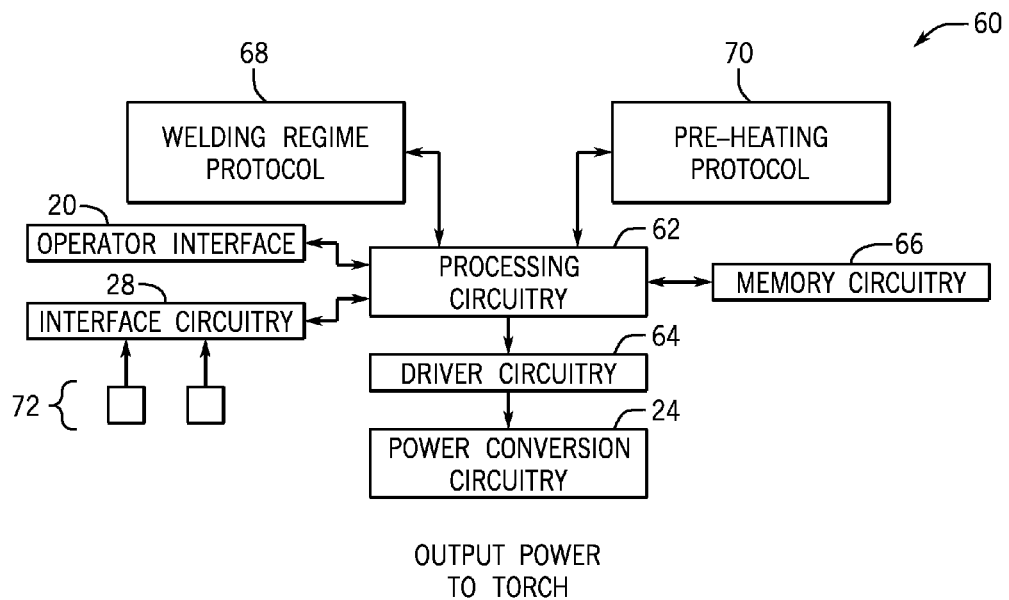
FIG. 2 is a diagrammatical representation of exemplary control circuitry components for a welding power supply of the type shown in FIG. 1.

FIG. 2 illustrates an exemplary embodiment for the control circuitry 22 designed to function in a system of the type illustrated in FIG. 1. The overall circuitry, designated here by reference numeral 60, includes the operator interface 20 discussed above and interface circuitry 28 for communication of parameters to and from downstream components such as a wirefeeder, a welding torch, and various sensors and/or actuators. The circuitry includes processing circuitry 62 which itself may comprise one or more application-specific or general purpose processors, designed to carry out welding regimes, make computations for waveforms implemented in welding regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for welding regimes. The processing circuitry 62 will also be associated with memory circuitry 66 which may consist of one or more types of permanent and temporary data storage, such as for providing the welding regimes implemented, storing welding parameters, storing weld settings, storing error logs, and so forth.

As discussed above, the present electrode preheating techniques allow for a preheating regime to be implemented, when desired, with any welding program carried out by the system. In the embodiment illustrated in FIG. 2, the scheme is implemented by separate programmed protocols implemented by the processing circuitry 62. That is, a welding regime protocol may comprise any known or future developed welding program, such as pulsed and non-pulsed regimes, as indicted by reference numeral 68. A preheating protocol is provided that may always be used, or that may be used only when selected by an operator, as indicated by reference numeral 70. In practice, the preheating protocol may be implemented and, upon termination, control may be taken in accordance with the selected welding protocol The waveforms generated based upon these protocols may result from software only, hardware, and/or firmware that is implemented by the processing circuitry and/or that forms part of the control and driver circuitry illustrated. The preheating protocol and the welding protocol will generally make use of feedback from sensors and inputs. These inputs may include weld settings, pre-programmed logic, and inputs from sensors 72 received during the welding process. Sensed parameters will typically include, for example, current and voltage applied to the welding torch, and therethrough, to the welding electrode.

Figure 3:
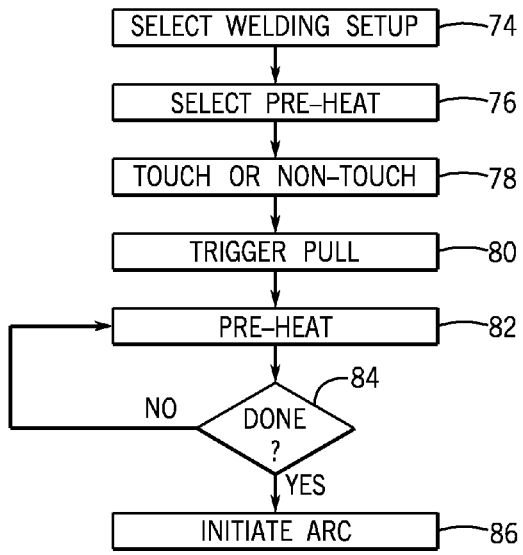
FIG. 3 is a flow chart illustrating exemplary steps in a welding process in which the electrode is preheated.

FIG. 3 illustrates exemplary logic for implementation of the preheating and welding techniques. In a typical process, the welding operator will make certain selections to define the welding setup, as indicated generally by reference numeral 74. Such selections may include a welding process, voltages, currents, wire feed speeds, and so forth. The selections may be made on the power supply, on the wire feeder, or both. At step 76, where desired, the operator may select to perform the preheating procedure described in the present disclosure. In certain systems, the preheating procedure may be automatically performed, although it is presently contemplated that the operator may select or de-select the preheating. Moreover, while manual welding systems are described, the same preheating processes may be performed in automated (e.g., robotic) systems.

At step 78, with the workpieces, cable, and other system components ready to execute the desired welds, the operator may either touch the wire electrode onto the workpiece, or proceed with a non-touch start. In a non-touch start, the electrode will be spaced from the workpiece. At step 80, then, the operator may pull the trigger on the torch to initiate the weld in a conventional manner. However, rather initiate the arc as is normally done for weld initiation, where the preheat sequence is to be performed, preheating will be performed as indicated at step 82. As described below, several scenarios may be envisaged for preheating, in general, however, the voltage and current are controlled for a sufficient period to raise the temperature of the weld electrode to a particular point. As indicated at step 84, the logic may cycle during this preheating phase, with the system determining whether the termination point of the preheating (see below) has been reached as indicated at step 84. If not, the preheating protocol is followed until the termination point is reached. Thereafter, the arc may be initiated as indicated at step 86 and the selected welding regime protocol will be followed starting with the preheated electrode.

Slightly different logic may be employed depending upon whether the start of the weld is from the touching situation or non-touch. For example, when performing a touching start, the system may implement a slight delay to detect the touch prior to preheating. In certain embodiments, prior to initiation of a welding arc, an amount of time that the electrode has not been under an arc condition may be determined, at least one of a preheating time, current, or voltage may be determined based on the determined amount of time, and termination of the preheating cycle may be terminated based on a timer (e.g., predetermined amount of time) that is set based on the determined preheating time, current, or voltage, for example. Moreover, the logic for implementing the preheating protocol may, in some cases, alter somewhat the welding regime that follows immediately after preheating. That is, because the electrode will be preheated, a lower initial current may be employed in the subsequent welding process. In presently contemplated embodiments, time periods while preheating may vary, depending upon such factors as the wire used, the currents and voltages applied, and so forth. Typical periods for preheating may vary, for example, between 10 and 20 ms. In practice, a baseline voltages and amperages may be set for different wire sizes, such as by establishing a baseline at approximately 100 A, with voltages set based upon the wire type and size. The wire type and size, as well as the wire feed speed used during welding and any different wire feed speeds used during a run-in phase that will typically be selected by the operator during the welding setup discussed above.

In general, the preheating may be thought of as adding energy to the electrode during what is effectively a short circuit between the electrode and the workpiece. As will be appreciated by those skilled in the art, the resistance of the electrode will typically increase as it is heated, and this increase in resistance may form the basis for the preheating protocol as well as for the point of termination of preheating. By monitoring voltage and current, then, and controlling these parameters the process may be free from dependency upon specific timing. In certain contemplated embodiments, the preheating protocol is based upon application of a fixed current (such as based on the wire selected) and increasing voltage from an initial level to a termination level when a voltage threshold is reached. Because the resistance of the wire (indicating a rising temperature) is indicated from the increasing voltage, with the current held steady, in accordance with Ohm's law, the protocol allows for raising the electrode resistance (and hence the temperature of the wire) to a desired and consistent level by simply monitoring the applied voltage. By way of example, a voltage level of 8v may be used as a threshold with a constant current of approximately 200 A. Once the voltage threshold is met, then, the system switches to the arc start phase, but which may be initiated at a lower or more predictable current than it would have been with a cold electrode or with an electrode of different, unknown, temperatures.

Figure 4:
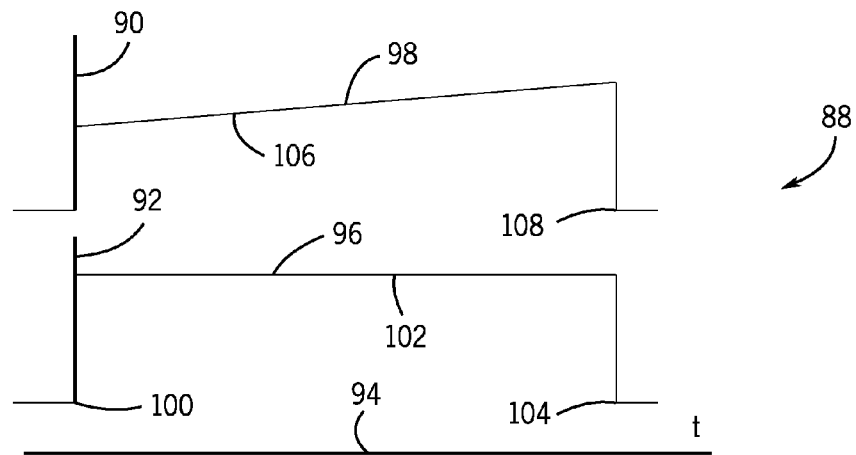
FIGS. 4 and 5 are illustrating voltage and current waveforms generated and applied for preheating an electrode.

FIG. 4 graphically illustrates waveforms in accordance with this aspect of the process. The graphically representation 88 is here presented with voltage along a vertical axis 90, current along a vertical axis 92, and time along a horizontal axis 94. A current waveform 96 can be seen as well as a voltage waveform 98. As noted above, at a point of initiation of the process, indicated generally by reference numeral 100, the current and voltage are applied by the power supply to the torch and then through to the welding electrode. In this example, the current is increased to a generally constant level as indicated by reference numeral 102, in this case approximately 100 A. At the same point of initiation, the voltage is increased to an initial voltage of approximately 1.4v, and is increased gradually to a level of approximately 2.5v. In this example the current and voltage are direct, and continuous. The point of termination at approximately 2.5v, corresponds to a point where it has been determined that the electrode has been sufficiently heated to begin welding. At that point, the current is reduced as indicated at reference numeral 104 as is the voltage as indicated at reference numeral 108. Thereafter, although not shown in FIG. 4, the welding process may begin with initiation of the arc.

Figure 5:
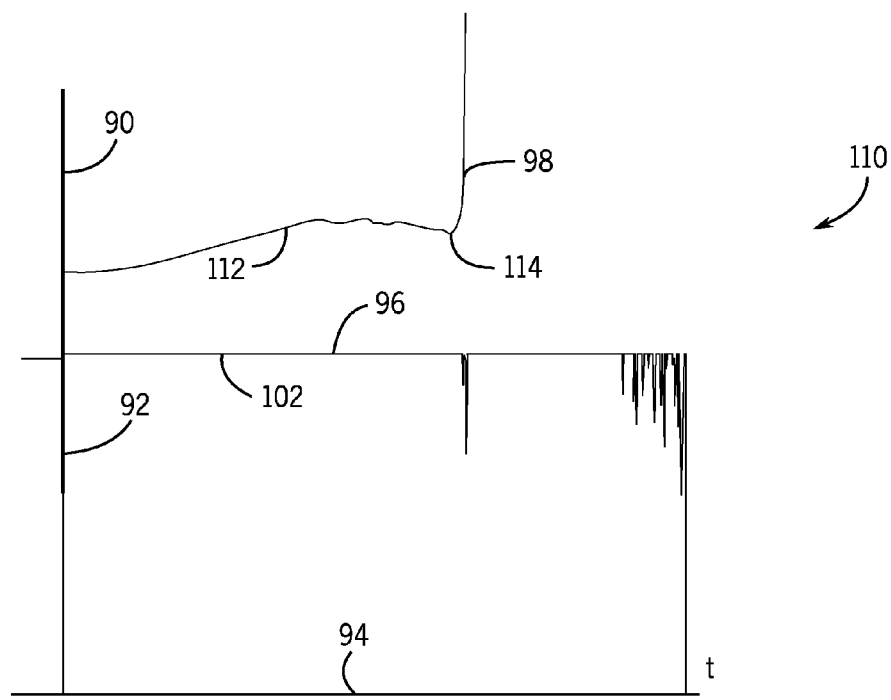

FIG. 5 illustrates an alternative control scheme as indicated generally by reference numeral 110. Here again, voltage is illustrated along a vertical axis 90 with current along a vertical axis 92, and time along a horizontal axis 94. In this case, both the current and voltage are applied to initiate the process, in this case a current of approximately 200 A is applied. The voltage is applied at an initial level and increases until the wire reaches a maximum temperature and flattens out or declines, as indicated generally by reference numerals 112 and 114. This decline may indicate that the wire will not undergo further resistance change by the application of additional energy. Thus, by monitoring the applied voltage, the trigger for terminating the process may be determined, followed by application of the selected welding protocol.

Still further variations may include, for example, ramping up current, such as to reduce the time for preheating. In a further alternative, rather than using a voltage threshold, a change in ramp rate of the voltage may indicated that the wire is at a maximum current density. Still further, the protocol may employ a constant voltage and watch for a drop in current to a threshold or a change in current ramp rate. As will be appreciated by those skilled in the art, or into the relationships dictated by Ohm's law, these various determinations will typically correspond to an increase in resistance of the welding electrode due to heating, which may be terminated at a desired voltage, current, power or any other desired threshold. With this in mind, it may also be possible to measure power and/or resistance and terminate the preheating processing based upon such analysis.

The power and/or resistance may be determined, for example, based upon the applied or detected voltages and currents. It should be noted that, while reference may be made in the current disclosure to controlling and/or monitoring voltage and current (or power, resistance, etc.), this should be understood to mean that one or both current and voltage may be controlled, and the other monitored. In fact, it is considered that "controlling" one of the parameters (e.g., voltage) includes monitoring insomuch as the process of controlling will include knowing the value, whether through active control, feedback, or both.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding method, comprising:
receiving a signal indicative of initiation of welding process;
prior to initiating a welding arc based on the received signal, controlling voltage or current applied to a welding electrode to preheat the electrode to a temperature above an ambient temperature but below a melting point of the welding electrode;
monitoring feedback voltage and current to determine a termination of preheating; and
terminating preheating prior to initiating the welding arc in accordance with a welding protocol.

2. The method of claim 1, wherein the signal is received from a welding torch as a result of an operator depressing a trigger of the torch.

3. The method of claim 1, wherein during preheating, current applied to the welding electrode is maintained generally constant and voltage feedback from the electrode is monitored for an increase.

4. The method of claim 3, wherein preheating is terminated when the voltage feedback from the electrode reaches a predetermined threshold value.

5. The method of claim 3, wherein preheating is terminated when the voltage feedback reaches a peak and declines.

6. The method of claim 1, wherein during preheating, voltage applied to the welding electrode is maintained generally constant and current feedback from the electrode is monitored for a decrease.

7. The method of claim 1, wherein the applied voltage and current are monitored to determine when the welding electrode has reached a resistance, and preheating is then terminated.

8. The method of claim 1, wherein the applied voltage and current are monitored to determine when the welding electrode has reached a power level, and preheating is then terminated.

9. The method of claim 1, wherein at least one of the applied current, the applied voltage and the termination of preheating is based upon a type and size of the electrode.

10. A welding method, comprising:
receiving a signal indicative of initiation of welding process;
prior to initiating a welding arc based on the received signal, automatically controlling voltage or current applied to a welding electrode to preheat the electrode to a temperature above an ambient temperature but below a melting point of the welding electrode;

terminating preheating when the electrode reaches a resistance or a power level as determined based upon monitored current and voltage applied to the welding electrode; and initiating the welding arc in accordance with a welding protocol after terminating preheating of the electrode.

11. The method of claim 10, wherein termination of preheating is based upon a feedback voltage reaching a threshold.

12. The method of claim 10, wherein termination of preheating is based upon a feedback current reaching a threshold.

13. The method of claim 10, wherein termination of preheating is based upon a feedback voltage reaching maximum level and declining.

14. The method of claim 10, wherein at least one of the applied current, the applied voltage and the termination of preheating is based upon a type and size of the electrode.

15. A welding system, comprising:
a power supply comprising power conversion circuitry and control circuitry configured to cooperate to provide welding current and voltage to a welding electrode; and
current and voltage monitoring sensors configured to sense current and voltage applied to the welding electrode by the power supply;
wherein the control circuitry is configured to receive a signal for initiation of a welding process and to, prior to initiating a welding arc based on the received signal, control the voltage and current applied to the welding electrode to preheat the welding electrode to a temperature above an ambient temperature but below a melting point of the welding electrode, to monitor the sensed current and voltage to determine a termination of preheating, and to terminate preheating prior to initiating the welding arc in accordance with a welding protocol.

16. The welding system of claim 15, comprising a welding torch configured provide a signal to the control circuitry to initiate the welding process.

17. The welding system of claim 15, wherein during preheating, current applied to the welding electrode is maintained generally constant and voltage feedback is monitored for an increase.

18. The welding system of claim 17, wherein preheating is terminated when the voltage applied to the welding electrode reaches a predetermined threshold value.

19. The welding system of claim 17, wherein preheating is terminated when the applied voltage reaches a peak and declines.

20. The welding system of claim 15, wherein during preheating, voltage applied to the welding electrode is maintained generally constant and current is monitored for a decrease.

21. The welding system of claim 15, wherein the applied voltage and current are monitored to determine when the welding electrode has reached a resistance, and preheating is then terminated.

22. The welding system of claim 15, wherein the applied voltage and current are monitored to determine when the welding electrode has reached a power level, and preheating is then terminated.

23. A welding method, comprising:
receiving a signal indicative of initiation of welding process;
prior to initiating a welding arc based on the received signal, determining an amount of time that a welding wire has not been under an arc condition;
determining at least one of a preheating time, current, or voltage based on the determined amount of time;
terminating a preheat cycle based on a timer; and
initiating the welding arc in accordance with a welding protocol after the preheat cycle has terminated.

* * * * *